(12) United States Patent
Kitajima (10) Patent No.: US 11,580,681 B2
(45) Date of Patent: Feb. 14, 2023

(54) IMAGE PROCESSING APPARATUS (71) Applicant: CANON KABUSHIKI KAISHA, Tokyo (JP)

(72) Inventor: Kotaro Kitajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/196,257

(22) Filed: Mar. 9, 2021

(65) Prior Publication Data

US 2021/0287414 A1   Sep. 16, 2021

(30) Foreign Application Priority Data

Mar. 11, 2020 (JP) .............................. JP2020-041587

(51) Int. Cl.
*G06T 11/60* (2006.01)
(52) U.S. Cl.
CPC .................................. *G06T 11/60* (2013.01)
(58) Field of Classification Search
CPC .... G06F 16/639; G06F 16/686; G06F 3/0488;
G06F 16/583; G06F 16/58; G06F 16/335;
G06F 16/9535; G06F 3/0484; G06F
40/169; G06F 16/168; G06F 16/242;
G06F 1/1694; G06F 16/5838; G06F
2200/1637; G06F 3/016; G06F 3/017;
G06F 3/0346; G06F 3/0482; G06F
16/245; G06F 16/951; G06F 16/9537;
G06F 21/6209; G06F 16/435; G06F
16/4393; G06F 3/04842; G06F 16/48;
G06F 3/0421; G06F 3/048; G06F
3/04845; G06F 15/16; G06F 16/00; G06F
16/40; G06F 16/434; G06F 16/51; G06F
16/587

See application file for complete search history.

(56) References Cited

U.S. PATENT DOCUMENTS

| | | | | |
|---|---|---|---|---|
| 2008/0168394 A1* | 7/2008 | Kawasaki | ............... | G06F 16/58 707/E17.026 |
| 2012/0281102 A1* | 11/2012 | Takahashi | .............. | G06Q 50/00 348/207.1 |
| 2016/0188558 A1* | 6/2016 | Shikawa | ............... | G06F 40/103 715/230 |
| 2018/0181281 A1* | 6/2018 | Suki | ..................... | G09B 29/003 |

FOREIGN PATENT DOCUMENTS

JP         2016086269 A       5/2016

* cited by examiner

*Primary Examiner* — Rayeez R Chowdhury
(74) *Attorney, Agent, or Firm* — Canon U.S.A., Inc. IP Division (57) ABSTRACT

An image processing apparatus includes: an image acquisition unit configured to acquire a photographed image; an editing unit configured to edit the photographed image by executing an action including an application and image processing that is a function of the application; an information acquisition unit configured to acquire photographing information on photographing of the photographed image; a first acquisition unit configured to acquire first history information indicating a history of actions for the photographed image; a second acquisition unit configured to acquire second history information based on at least a history of actions for an image different from the photographed image; and a control unit configured to determine a candidate for an action that is to be executed next on a basis of the first history information and the second history information and perform control to notify the determined candidate.

12 Claims, 8 Drawing Sheets

| ID | TYPE OF IMAGE PROCESSING |
|---|---|
| P001 | SKIN APPEARANCE IMPROVEMENT PROCESSING |
| P002 | BACKGROUND BLURRING PROCESSING |
| P003 | FIRST EFFECT PROCESSING (COLOR FILTER PROCESSING) |
| P004 | TRIMMING PROCESSING |
| P005 | LAYOUT CHANGE PROCESSING |
| P006 | LIGHTING PROCESSING |
| P007 | SECOND EFFECT PROCESSING (MONOCHROME FILTER PROCESSING) |

FIG. 5A

| | PERSON (PORTRAIT) | | | LANDSCAPE (NATURE) | | |
|---|---|---|---|---|---|---|
| INDIVIDUAL HISTORY INFORMATION | FIRST FREQUENCY | APPLICATION ID | A011 | FIRST FREQUENCY | APPLICATION ID | A001 |
| | | PROCESSING ID | P001 (SKIN) | | PROCESSING ID | P003 (FIRST EFFECT) |
| | SECOND FREQUENCY | APPLICATION ID | A015 | SECOND FREQUENCY | APPLICATION ID | A002 |
| | | PROCESSING ID | P002 (BACKGROUND BLURRING) | | PROCESSING ID | P004 (TRIMMING) |
| | THIRD FREQUENCY | APPLICATION ID | A004 | THIRD FREQUENCY | APPLICATION ID | A002 |
| | | PROCESSING ID | P003 (FIRST EFFECT) | | PROCESSING ID | P003 (FIRST EFFECT) |
| | FOURTH FREQUENCY | APPLICATION ID | A002 | FOURTH FREQUENCY | APPLICATION ID | A009 |
| | | PROCESSING ID | P006 (LIGHTING) | | PROCESSING ID | P005 (LAYOUT CHANGE) |
| | ... | | | ... | | |

| CUISINE | | |
|---|---|---|
| FIRST FREQUENCY | APPLICATION ID | A002 |
| | PROCESSING ID | P003 (FIRST EFFECT) |
| SECOND FREQUENCY | APPLICATION ID | A002 |
| | PROCESSING ID | P004 (TRIMMING) |
| THIRD FREQUENCY | APPLICATION ID | A004 |
| | PROCESSING ID | P003 (FIRST EFFECT) |
| FOURTH FREQUENCY | APPLICATION ID | A011 |
| | PROCESSING ID | P006 (LIGHTING) |
| ... | | |

FIG. 5B

| | PERSON (PORTRAIT) | | | LANDSCAPE (NATURE) | | |
|---|---|---|---|---|---|---|
| GENERAL HISTORY INFORMATION | FIRST FREQUENCY | APPLICATION ID | A020 | FIRST FREQUENCY | APPLICATION ID | A002 |
| | | PROCESSING ID | P001 (SKIN) | | PROCESSING ID | P003 (FIRST EFFECT) |
| | SECOND FREQUENCY | APPLICATION ID | A011 | SECOND FREQUENCY | APPLICATION ID | A001 |
| | | PROCESSING ID | P001 (SKIN) | | PROCESSING ID | P003 (FIRST EFFECT) |
| | THIRD FREQUENCY | APPLICATION ID | A001 | THIRD FREQUENCY | APPLICATION ID | A021 |
| | | PROCESSING ID | P002 (BACKGROUND BLURRING) | | PROCESSING ID | P003 (FIRST EFFECT) |
| | FOURTH FREQUENCY | APPLICATION ID | A002 | FOURTH FREQUENCY | APPLICATION ID | A045 |
| | | PROCESSING ID | P001 (SKIN) | | PROCESSING ID | P004 (TRIMMING) |
| | ... | | | ... | | |

⋮

| | CUSINE | | |
|---|---|---|---|
| | FIRST FREQUENCY | APPLICATION ID | A002 |
| | | PROCESSING ID | P003 (FIRST EFFECT) |
| | SECOND FREQUENCY | APPLICATION ID | A002 |
| | | PROCESSING ID | P004 (TRIMMING) |
| | THIRD FREQUENCY | APPLICATION ID | A004 |
| | | PROCESSING ID | P002 (BACKGROUND BLURRING) |
| | FOURTH FREQUENCY | APPLICATION ID | A011 |
| | | PROCESSING ID | P004 (TRIMMING) |
| | ... | | |

FIG. 6A

| No. | DETERMINATION CRITERION | POINT |
|---|---|---|
| 1 | IS PROCESSING ID OF TARGET ACTION INCLUDED IN IMAGE HISTORY INFORMATION? | NOT INCLUDED 20 → →0 INCLUDED |
| 2 | IS EXECUTION FREQUENCY OF TARGET ACTION HIGH? | HIGH 9←8←6←4←2←0 LOW |
| 3 | IS RELATIONSHIP BETWEEN IMAGE PROCESSING OF TARGET ACTION AND MOST-RECENT IMAGE PROCESSING HIGH? | HIGH 9←8←6←4←2←0 LOW |
| 4 | IS TARGET ACTION EXECUTABLE BY APPLICATION UNDER EXECUTION? | EXECUTABLE 5← →2 INEXECUTABLE |
| 5 | HAS APPLICATION OF TARGET ACTION BEEN INSTALLED? | INSTALLED 20 ← →0 NOT INSTALLED |
| 6 | IS TARGET ACTION EXECUTABLE BY EXTERNAL DEVICE? | EXECUTABLE 5← →0 INEXECUTABLE |

FIG. 6B

| | SKIN | BACKGROUND BLURRING | FIRST EFFECT | TRIMMING | LAYOUT CHANGE | LIGHTING | SECOND EFFECT |
|---|---|---|---|---|---|---|---|
| | P001 | P002 | P003 | P004 | P005 | P006 | P007 |
| P001 (SKIN) | 0 | 9 | | 4 | 5 | 8 | 3 |
| P002 (BACKGROUND BLURRING) | 9 | 0 | | 4 | 5 | 6 | 5 |
| P003 (FIRST EFFECT) | 4 | 4 | | 0 | 5 | 4 | 0 |
| P004 (TRIMMING) | 5 | 5 | | 5 | 6 | 3 | 4 |
| P005 (LAYOUT CHANGE) | 5 | 6 | | 4 | 0 | 3 | 4 |
| P006 (LIGHTING) | 8 | 0 | | 0 | 3 | 0 | 5 |
| P007 (SECOND EFFECT) | 3 | 5 | | 4 | 4 | 5 | 0 |

FIG. 7

IMAGE PROCESSING APPARATUS

BACKGROUND

Field of the Disclosure

The present disclosure relates to an image processing apparatus.

Description of the Related Art

In recent years, in mobile terminals such as smart phones, images photographed by the digital camera function of the mobile terminal are edited (processed) using various applications. With the functionality of the mobile terminals becoming higher, the types of applications executable by mobile terminals have increased. When editing images on a mobile terminal, a user selects any of a plurality of applications installed in the mobile terminal according to the type of desired image processing or the like and edits an image by the selected application.

Japanese Patent Application Laid-open No. 2016-86269 discloses a mobile terminal that is capable of executing a plurality of applications in parallel and causes the execution screen of one application, selected from among the execution screens of the plurality of applications, to be displayed on a display surface.

However, the conventional mobile terminals require a complicated operation when performing a plurality of processing on one image by using a plurality of applications. As an example, here, a case in which skin appearance improvement processing is performed on an image by a first application and then background blurring processing is performed on the image by a second application is considered. In this case, after executing the skin appearance improvement processing by the first application, the user temporarily stores the image (ends the first application) and selects (and activates) the second application. Then, with the second application, the user selects and displays again the image to which the skin appearance improvement processing has been performed by the first application, and specifies and executes background blurring processing, and then stores the image. When performing a plurality of image processing on one image by using a plurality of applications in this way, the user is required to execute the same operation many times for application selection, image selection, image storage, or the like, and this makes the operation complicated.

SUMMARY

The present disclosure provides a technique to improve operability in a case in which processing is performed on one image by using a plurality of applications.

An image processing apparatus, according to some embodiments, includes at least one memory and at least one processor which function as: an image acquisition unit configured to acquire a photographed image; an editing unit configured to execute an action including an application and image processing that is a function of the application and edit the photographed image; an information acquisition unit configured to acquire photographing information on photographing of the photographed image; a first acquisition unit configured to acquire first history information indicating a history of actions for the photographed image; a second acquisition unit configured to acquire second history information based on at least a history of actions for an image different from the photographed image, on a basis of the photographing information; and a control unit configured to determine a candidate for an action that is to be executed next on a basis of the first history information and the second history information and perform control to notify the determined candidate.

Further features of various embodiments will become apparent from the following description of exemplary embodiments with reference to the attached drawings.

BRIEF DESCRIPTION OF THE DRAWINGS

FIG. 5A is a diagram showing an example of individual history information according to the present embodiment and FIG. 5B is a diagram showing an example of general history information according to the present embodiment;

DESCRIPTION OF THE EMBODIMENTS

Hereinafter, exemplary embodiments will be described in detail on the basis of the accompanying drawings. As an example of an image processing apparatus to which the exemplary embodiments are applied, a mobile terminal with a photographing function (specifically, a mobile terminal with a camera) will be described below.

Configuration

Figure 1:
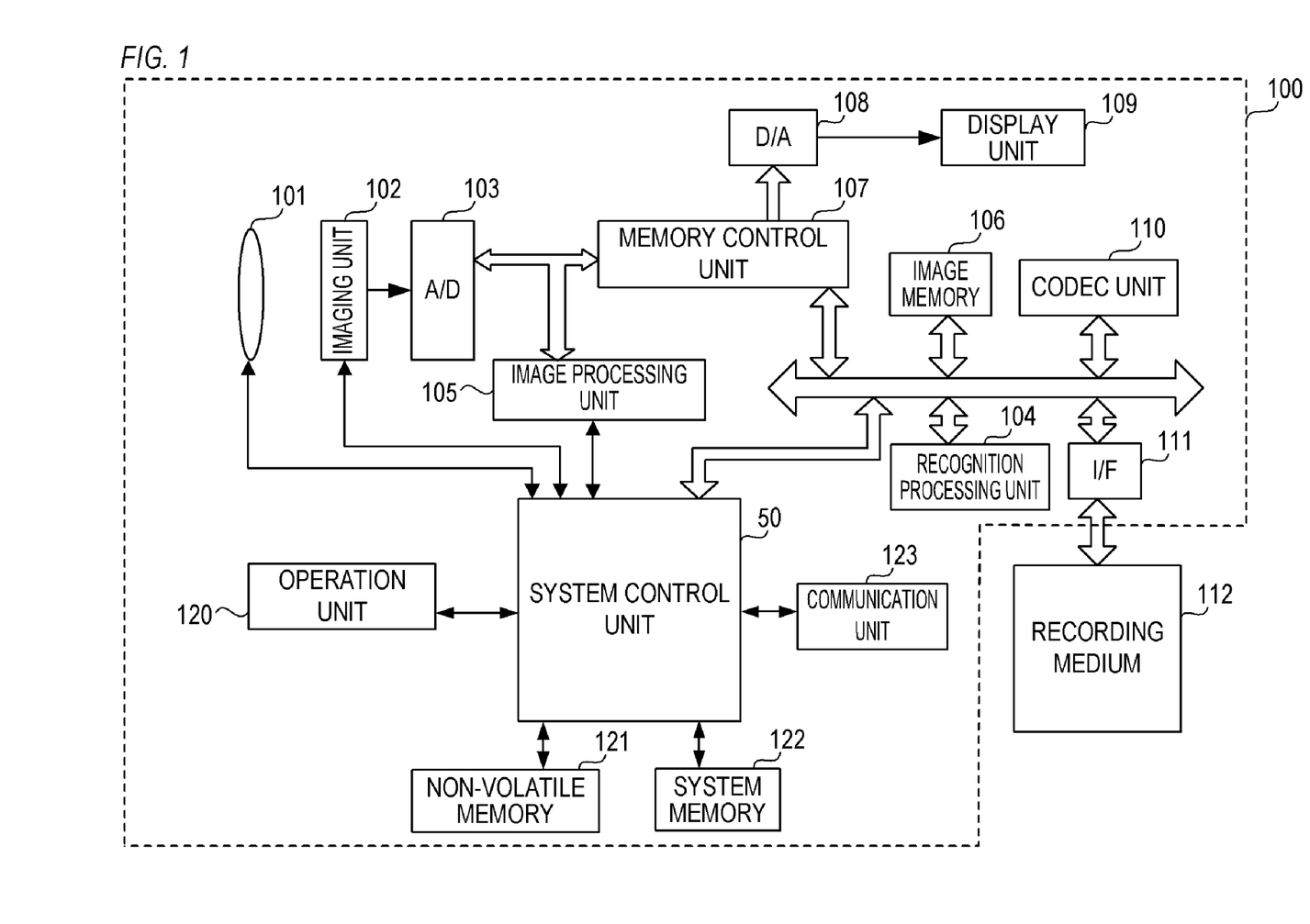
FIG. 1 is a block diagram of a mobile terminal according to the present embodiment.

FIG. 1 is a block diagram showing a configuration example of a mobile terminal 100 according to the present embodiment. A lens 101 forms an image of light (object light) from an object on an imaging unit 102. The imaging unit 102 is an imaging element constituted by a CCD element, a CMOS element, or the like and converts a formed optical image into an electric signal (image data) (photoelectric conversion). An A/D converter 103 converts an analog signal into a digital signal. A recognition processing unit 104 analyzes a photographing scene of a photographed image (captured and recorded image). An image processing unit 105 applies various image processing to image data (digital signal) output from the A/D converter 103. An image memory 106 stores image data. A memory control unit 107 controls the reading/writing of image data with respect to the image memory 106. A D/A converter 108 converts a digital signal into an analog signal. A display unit 109 is an indicator, such as a liquid-crystal display (LCD). A codec unit 110 executes the compression coding or decoding of image data. An I/F 111 is an interface with a recording medium 112. The recording medium 112 is a memory card, a hard disk, or the like. A system control unit 50 controls the whole mobile terminal 100. An operation unit 120 receives an operation by a user (user operation). A non-volatile memory 121 is an EEPROM or the like and stores programs, parameters, or the like. In a system memory 122, constants or variables for operating the system control unit 50, programs read from the non-volatile memory 121 by the system control unit 50, or the like are developed. A communication unit 123 executes communication with an external device.

The basic operation of the mobile terminal 100 at the time of photographing will be described. The imaging unit 102 converts light incident via the lens 101 into an electric signal and outputs the obtained electric signal (analog image signal) to the A/D converter 103. The A/D converter 103 converts the analog image signal output from the imaging unit 102 into a digital image signal and outputs the digital image signal to the image processing unit 105. The image processing unit 105 performs color conversion processing, such as white balance adjustment, gamma correction processing, contour enhancement processing, or the like, on the image data (digital image signal) from the A/D converter 103 or image data from the memory control unit 107. The image data output from the image processing unit 105 is written into the image memory 106 via the memory control unit 107. In the image memory 106, image data that is output from the imaging unit 102 and converted by the A/D converter 103, image data that is to be displayed on the display unit 109, or the like is stored. The D/A converter 108 converts the image data for display stored in the image memory 106 into an analog signal and supplies the analog signal to the display unit 109. The display unit 109 executes a display corresponding to the analog signal from the D/A converter 108. The codec unit 110 executes compression coding based on a standard, such as JPEG and MPEG on the image data for recording (photographing) stored in the image memory 106. The system control unit 50 stores the image data after the compression coding in the recording medium 112 via the interface 111. When the codec unit 110 generates a plurality of image data corresponding to a plurality of standards of the compression coding, respectively, as image data after the compression coding, the system control unit 50 stores the plurality of image data in the recording medium 112 in association with each other.

Besides the above basic operation, the system control unit 50 executes an application program stored in the non-volatile memory 121 to realize respective processing that will be described later. On this occasion, the system control unit 50 develops a constant or a variable for operating the system control unit 50, a program read from the non-volatile memory 121, or the like in the system memory 122.

Application Processing

Figure 2A:
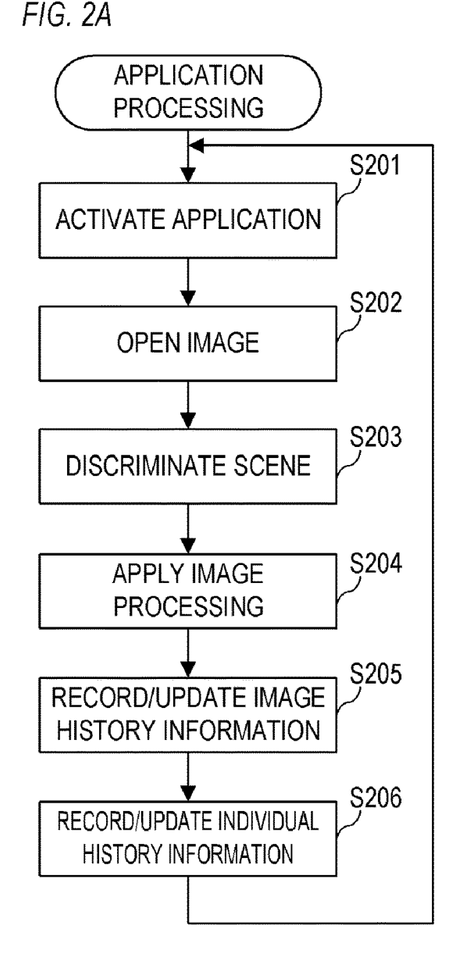
FIG. 2A is a flowchart of application processing according to the present embodiment and FIG. 2B is a flowchart of next-action processing according to the present embodiment.

FIG. 2A is a flowchart showing the details of application processing executed by the mobile terminal 100. The application processing is processing to execute an application to edit (process) an image. Specifically, in the application processing, the system control unit 50 executes an application and executes image processing using the image processing unit 105 as its function. The application processing is realized when the system control unit 50 develops and executes a program stored in the non-volatile memory 121 in the system memory 122. For example, the application processing starts when the mobile terminal 100 is activated.

Figure 3A:
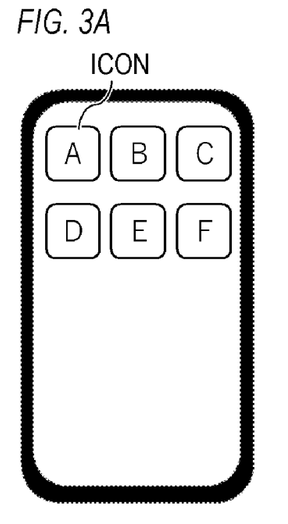
FIGS. 3A to 3F are diagrams showing a display example of various screens according to the present embodiment.
Figure 3B:
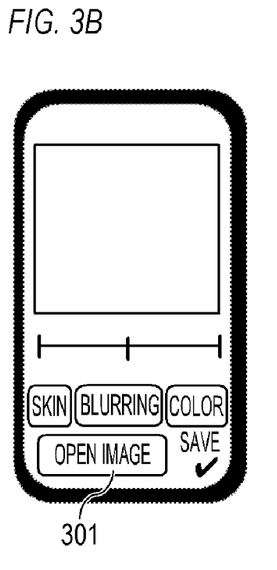

In S201, the system control unit 50 activates (executes) any of a plurality of image processing applications according to a user operation on the operation unit 120. FIG. 3A shows a display example of a menu screen in the display unit 109. In the present embodiment, the system control unit 50 controls the display unit 109 or the like to execute various displays on the display unit 109. On the menu screen, a plurality of icons corresponding to a plurality of applications (applications A to F) installed in the mobile terminal 100, respectively, are displayed. Each of the applications A to F is an image processing application with which it is possible to execute image processing to edit a photographed image. The system control unit 50 selects and activates an application corresponding to a specified icon according to a user operation to specify (select) any of the plurality of icons displayed on the menu screen. Then, the system control unit 50 displays the screen of the activated application (application screen) on the display unit 109. A screen displayed on the display unit 109 (display screen) is transitioned (switched) from the menu screen to the application screen in the present embodiment, but a new screen may be additionally displayed in a state in which the screen is continuously displayed. FIG. 3B shows a display example of the screen of an application after the activation of the application.

Figure 3C:
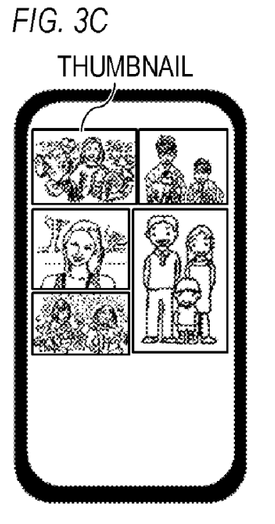
Figure 3D:
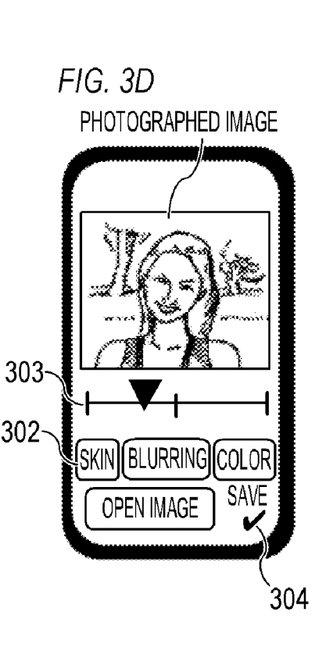

In S202, the system control unit 50 opens any of a plurality of images stored in the recording medium 112 (image open; image acquisition) according to a user operation on the operation unit 120. In the recording medium 112, images photographed by the mobile terminal 100, images input (acquired) from an external device via the communication unit 123, or the like are stored. The system control unit 50 displays an image selection screen on the display unit 109 according to a user operation to select (specify) an open icon 301 displayed on the screen (application screen) of FIG. 3B. In the present embodiment, the display screen of the display unit 109 is transitioned from the application screen to the image selection screen. FIG. 3C shows a display example of the image selection screen. On the image selection screen, a plurality of thumbnails corresponding to a plurality of images stored in the recording medium 112, respectively, are displayed. The system control unit 50 selects and opens an image corresponding to a specified thumbnail according to a user operation to select (specify) any of the plurality of thumbnails displayed on the image selection screen. Specifically, the system control unit 50 displays an image corresponding to a specified thumbnail on the application screen. In the present embodiment, the system control unit 50 restores the display screen of the display unit 109 from the image selection screen to the application screen and displays an image on the application screen. FIG. 3D shows a display example of the application screen after an image is opened. In the present embodiment, it is possible to edit an image displayed on the application screen (opened image). An image to be edited is not particularly limited but includes a photographed image in the present embodiment.

In S203, the system control unit 50 analyzes the image opened in S202 by the recognition processing unit 104 and discriminates a photographing scene of the image (scene information acquisition). The discriminated photographing scene is not particularly limited, but any of "person (portrait)", "landscape (nature)", "vehicle", "animal", and "cuisine" is discriminated as such in the present embodiment. Note that various known technologies are available in processing to discriminate the photographing scene.

Figure 4:
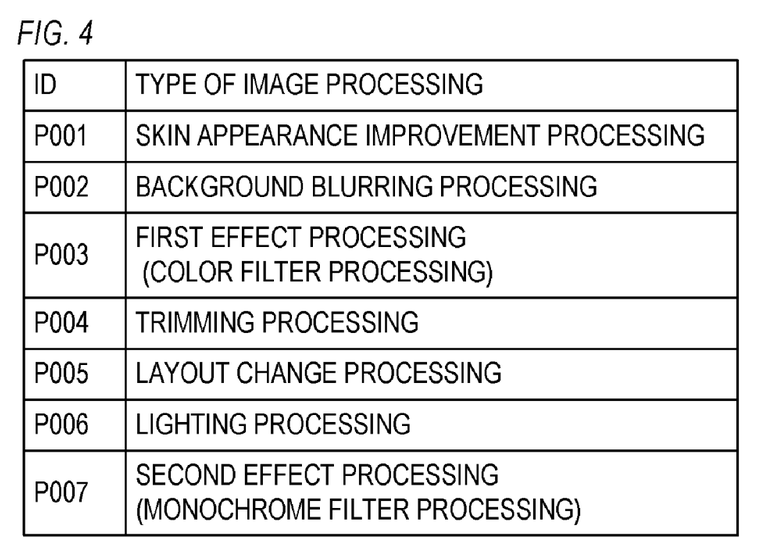
FIG. 4 is a diagram showing an example of image processing according to the present embodiment.

In S204, the system control unit 50 determines the type of image processing that is the function of an application and the parameter of the image processing (processing parameter) according to a user operation on the operation unit 120. Then, the system control unit 50 performs the determined type of the image processing on the image to be edited using the determined processing parameter. On the application screen of FIG. 3D, icons 302 for selecting the type of image processing and an item 303 for adjusting a processing parameter such as correction strength are displayed. The system control unit 50 determines the type of image processing according to a user operation to specify (select) any of the icons 302 and determines a processing parameter according to a user operation on the item 303. In the present embodiment, seven types of image processing (skin appearance improvement processing, background blurring processing, first effect processing (color filter processing), trimming processing, layout change processing, lighting processing, and second effect processing (monochrome filter processing)) shown in FIG. 4 are possible. That is, it is possible to execute at least any of the seven types of the image processing shown in FIG. 4 in each of the applications A to F. Note that the type or the number of executable image processing is not particularly limited and image processing not shown in FIG. 4 may be executable. Further, (the same type of) image processing similar between different applications are regarded as the same image processing in the present embodiment. Specifically, as shown in FIG. 4, the system control unit 50 manages a processing ID for each type of image processing. The same type of image processing that is executed in different applications is managed by a common processing ID.

In S205, the system control unit 50 generates image history information showing the action executed in S204 and records the generated image history information on the recording medium 112 in association with the image to be edited (edited image; image data). When the image history information associated with the image to be edited exists, the system control unit 50 updates the image history information to further show the action executed in S204. Specifically, after executing the image processing in S204, the system control unit 50 generates or updates image history information according to a user operation to specify (select) a save icon 304 displayed on the application screen of FIG. 3D. The image history information is, for example, recorded as metadata in the header of an image. The action is a combination of an application to execute image processing and the type of the image processing, and the image history information is information showing the history of actions for a corresponding image. In the present embodiment, the image history information includes an application ID (identifier showing an application), a processing ID, and a processing parameter as information corresponding to a single action.

In S206, the system control unit 50 generates individual history information on the basis of the photographing scene discriminated in S203 and the action executed in S204 and records the generated individual history information on the recording medium 112 or the non-volatile memory 121. When the individual history information exists, the system control unit 50 updates the individual history information on the basis of the photographing scene discriminated in S203 and the action executed in S204. The individual history information is information based on the history of actions by a specific user (one). When image processing is executed on a plurality of images, the individual history information becomes information based on the histories of actions for the plurality of images. FIG. 5A shows an example of the individual history information. The individual history information of FIG. 5A shows executed actions in descending order of an execution frequency for each photographing scene. For example, the individual history information of FIG. 5A shows that the execution frequency of an action to execute the skin appearance improvement processing of the processing ID=P001 using the application of the application ID=A011 is the highest about the photographing scene "person". Note that although not shown in FIG. 5A, the individual history information also includes processing parameters in the present embodiment.

According to the application processing of FIG. 2A, information on an action is reflected (accumulated) on the image history information or the individual history information every time the action is executed.

Next-Action Processing

Figure 2B:
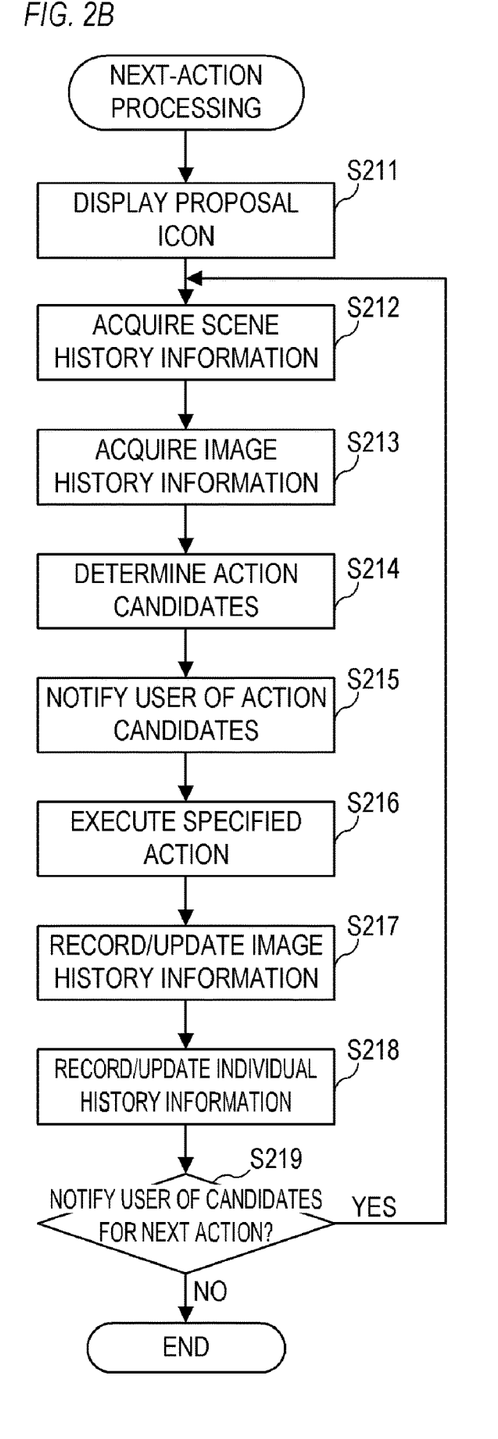

FIG. 2B is a flowchart showing the details of next-action processing executed by the mobile terminal 100. The next-action processing includes processing to notify (propose) a user of candidates (action candidates) for an action that is to be next executed on an image to be edited. The next-action processing is realized when the system control unit 50 develops and executes a program stored in the non-volatile memory 121 in the system memory 122. The next-action processing starts at timing at which predetermined processing relating to an image to be edited is executed, for example, at predetermined timing, such as immediately after an image is opened by an application and immediately after an image is saved.

Figure 3E:
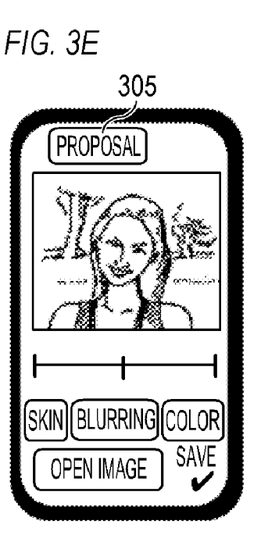

In S211, the system control unit 50 displays a proposal icon 305 on the application screen, for example as shown in FIG. 3E. The proposal icon 305 is an icon for notifying a user of candidates (action candidates) for an action that is to be next executed. The processing proceeds to S212 when a user operation to specify (select) the proposal icon 305 is executed.

Figure 5B:
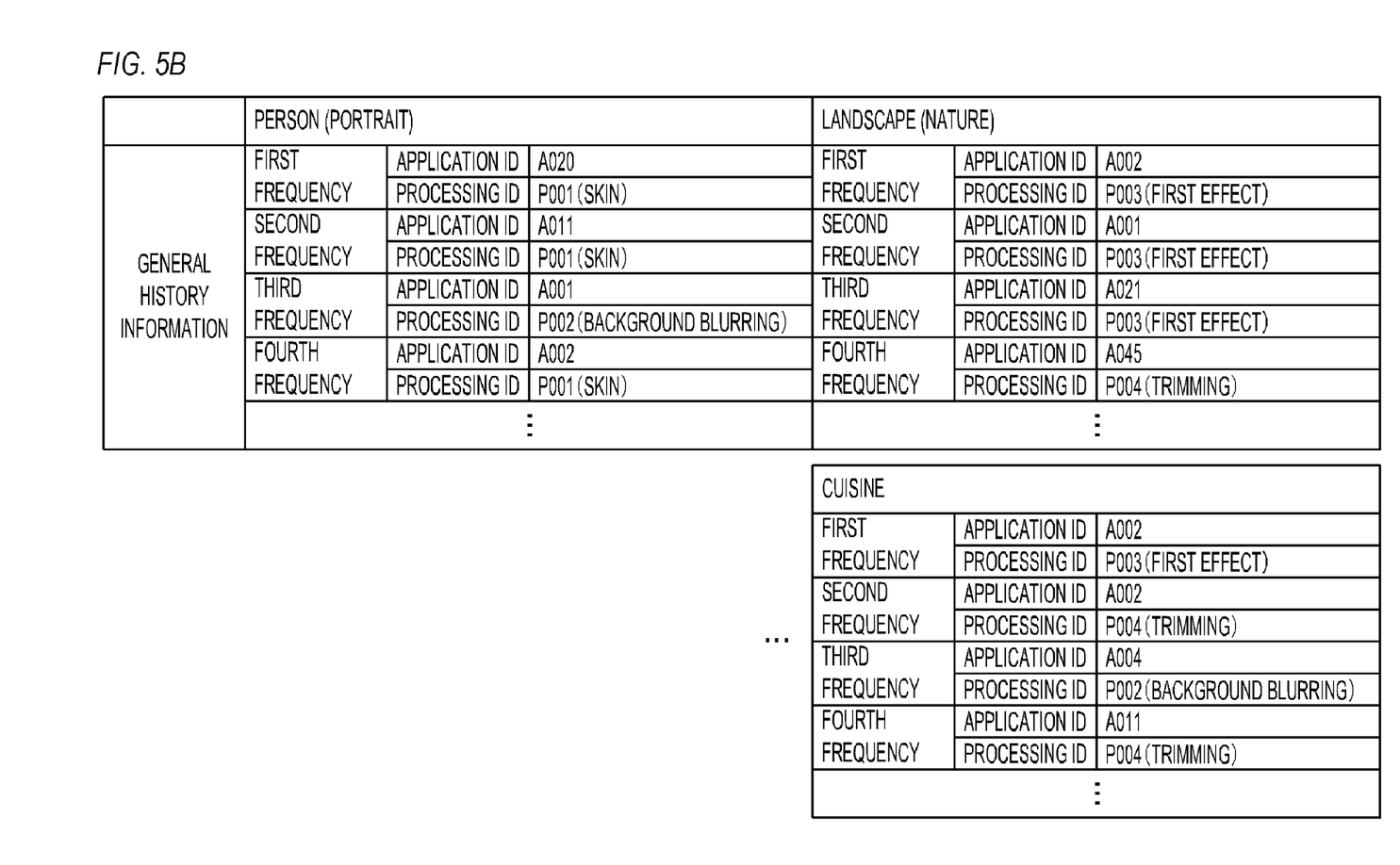

In S212, the system control unit 50 acquires scene history information (such as a part of individual history information) corresponding to a photographing scene on the basis of the photographing scene of an image to be edited (currently-opened image). The photographing scene is discriminated by the same processing as the processing executed in S203 (by the analysis of the recognition processing unit 104). It can be said that the acquired scene history information is history information based on the history of actions for images in a scene that is the same as or similar to the photographing scene of the image to be edited. In the present embodiment, the scene history information is acquired from each of the individual history information and general history information. The general history information is generated, recorded, and updated like the individual history information. The general history information is information same as the individual history information but is information based on the history of actions by unspecified users (one or a plurality of users). Since actions not generally used by a current user may be presented as candidates with reference to the entire history information, the current user is allowed to find out new actions. FIG. 5B shows an example of the general history information. Note that the scene history information may be acquired from only one of the individual history information and the general history information. For example, when at least a predetermined number of actions are not reflected on the individual history information, the scene history information may be acquired from only the general history information.

In S213, the system control unit 50 acquires image history information on the image to be edited from the metadata of the image.

In S214, the system control unit 50 determines candidates (action candidates) for an action that is to be next executed on the basis of the scene history information acquired in S212 and the image history information acquired in S213. Specifically, the system control unit 50 determines the priority of the action that is to be next executed on the basis of the scene history information acquired in S212 and the image history information acquired in S213 and determines action candidates on the basis of the determined priority. In the present embodiment, the system control unit 50 determines each of priority based on the individual history information (the scene history information acquired from the individual history information) and priority based on the general history information (the scene history information acquired from the general history information). Then, the system control unit 50 determines action candidates based on the individual history information and action candidates based on the general history information.

A method for determining the action candidates will be specifically described. The action candidates based on the individual history information and the action candidates based on the general history information are determined by the same processing. First, the system control unit 50 extracts a first predetermined number of (for example, ten) actions in descending order of an execution frequency from a plurality of actions shown by the scene history information. Next, the system control unit 50 calculates priority according to predetermined determination criteria for the extracted respective actions. In the present embodiment, the system control unit 50 calculates six points according to six types of determination criteria shown in FIG. 6A and calculates the total value of the six points as priority for one action. Then, the system control unit 50 determines a second number of (a number smaller than the first number; for example, one to three) actions in descending order of priority among the extracted first number of the actions as action candidates. Note that the first predetermined number and the second predetermined number may be different between processing to determine the action candidates based on the individual history information and processing to determine the action candidates based on the general history information. Further, the number and the types of the determination criteria are not particularly limited.

Figure 6A:
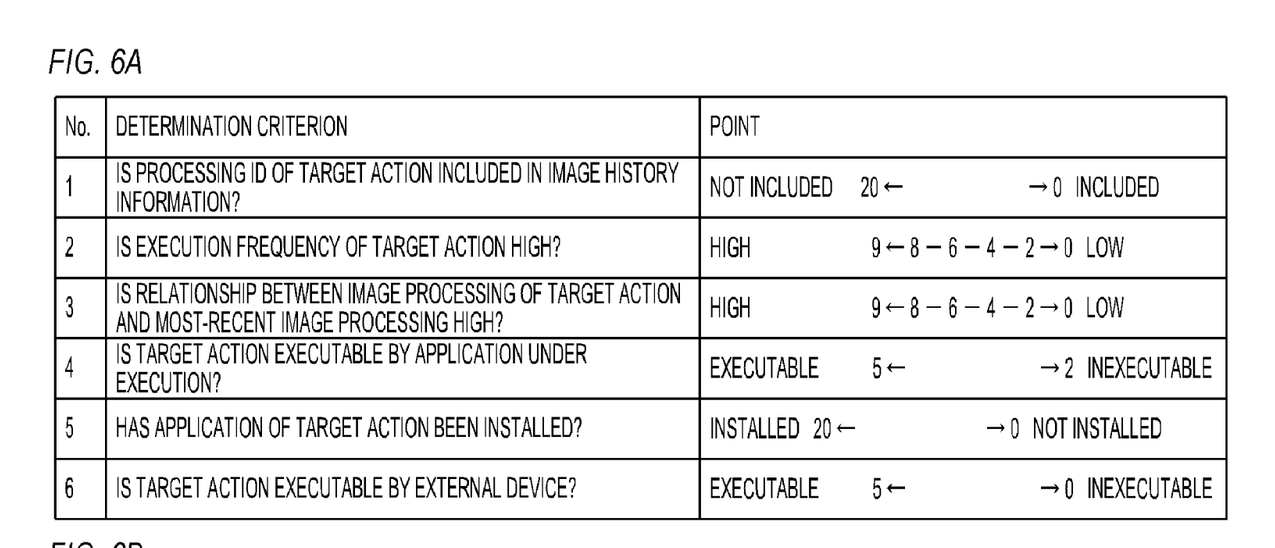
FIGS. 6A and 6B are diagrams showing an example of point determination criteria according to the present embodiment.

The determination criteria shown in FIG. 6A will be described. A first determination criterion (determination criterion No. 1) is the determination criterion of a point as to whether a processing ID corresponding to an action for which priority is calculated (an action extracted from the scene history information; a target action) is included in the image history information. Zero points are determined when the processing ID of the target action is included in the image history information. Otherwise, 20 points are determined. Thus, an action including the same image processing as image processing that was performed on an image to be edited in the past is not likely to be determined as an action candidate, whereby it is possible to prevent the same type of image processing from being doubly performed on the image. In other words, an action including image processing having not been performed on an image to be edited is likely to be determined as an action candidate.

A second determination criterion is the determination criterion of a point according to the order (frequency order) of the execution frequency of a target action. A value obtained by subtracting a frequency order from ten (the first predetermined number described above) is determined as a point. Specifically, nine points are determined when the frequency order of a target action is in the first place, and eight points are determined when the frequency order of the target action is in the second place. Further, zero points are determined when the frequency order of the target action is in the tenth place. Thus, an action having a higher execution frequency is likely to be determined as an action candidate.

Figure 6B:
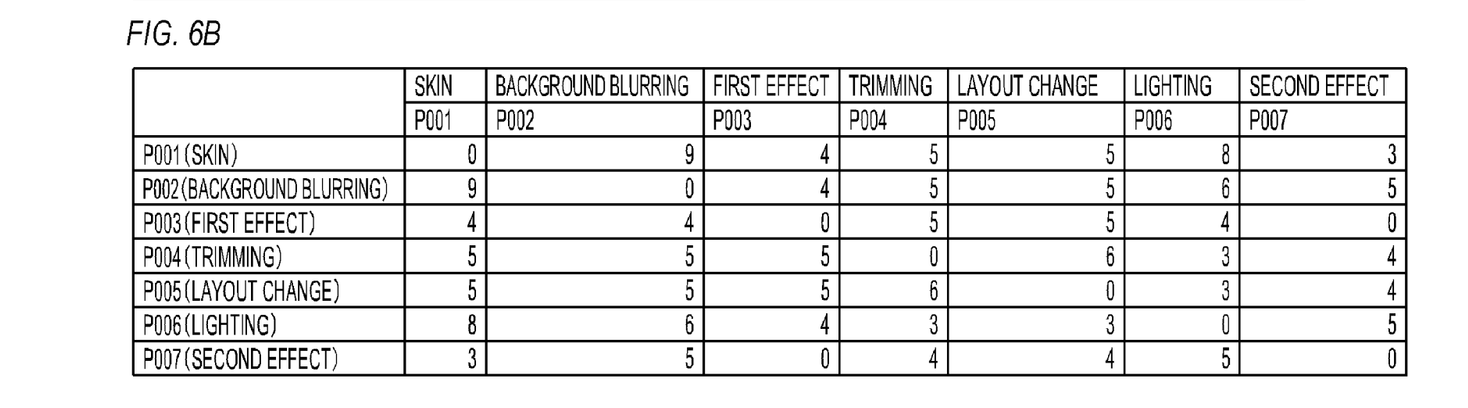

A third determination criterion is the determination criterion of a point according to the relationship between image processing (processing ID) most-recently performed on an image to be edited and image processing (processing ID) included in a target action. The image processing most-recently performed on the image to be edited is determined from the image history information. In the present embodi-ment, relationship information shown in FIG. 6B is recorded on the recording medium 112 or the non-volatile memory 121 in advance. The relationship information of FIG. 6B shows the corresponding relationship between image processing most-recently performed on an image to be edited, image processing included in a target action, and points. In the relationship information of FIG. 6B, a higher point is set as the relationship between image processing most-recently performed and image processing included in a target action is higher (a lower point is set as the relationship is lower). For example, nine points are determined when most-recently performed image processing is the skin appearance improvement processing (the processing ID=P001) and image processing included in a target action is the background blurring processing (the processing ID=P002). Thus, an action including image processing having a higher relationship (a higher degree of a relationship) with most-recently performed image processing is likely to be determined as an action candidate. Note that the relationship information of FIG. 6B may be fixed information or information (statistically-determined information) updated on the basis of the history of an action.

Fourth and fifth determination criteria are the determination criteria of a point based on the state of an application in the mobile terminal 100.

The fourth determination criterion is the determination criterion of a point according to whether a target action is executable by an application (foreground) that is under execution in the mobile terminal 100, that is, according to whether a target action includes an application that is under execution. When a target action is executable by an application that is under execution, the switching of the application or the like becomes unnecessary. Therefore, a higher point is determined compared with a case in which the target action is not executable by the application that is under execution. For example, five points are determined when a target action is executable by an application that is under execution. Otherwise, two points are determined. Thus, an action executable by an application that is under execution is likely to be determined as an action candidate.

The fifth determination criterion is the determination criterion of a point according to whether an application included in a target action has been installed in the mobile terminal 100. When an application included in a target action has been installed in the mobile terminal 100, the installation of the application becomes unnecessary. Therefore, a higher point is determined compared with a case in which the application has not been installed in the mobile terminal 100. For example, five points are determined when an application included in a target application has been installed in the mobile terminal 100. Otherwise, zero points are determined. Thus, an action including an application that has been installed is likely to be determined as an action candidate.

Depending on an action, the mobile terminal 100 transmits an image to be edited to an external device, such as a cloud terminal, and causes the external device to execute the action. A sixth determination criterion is the determination criterion of a point based on the executability of an action by an external device. If a target action is executable when the target action is an action executed by an external device, a higher point is determined compared with a case in which the target action is inexecutable. For example, zero points are determined when an action by an external device is not stably executable, such as when the communication state between the mobile terminal 100 and an outside device is not good (such as when communication strength is not more than a predetermined threshold). Further, five points are determined when an action by an external device is stably executable, such as when the communication state between the mobile terminal 100 and an outside device is good (such as when communication strength is higher than a predetermined threshold). Five points are determined regardless of the executability of an action by an external device when a target action is not an action executed by the external device (when the target action is the action executed by the mobile terminal 100). Thus, when an action by an external device is not stably executable, the action is not likely to be determined as an action candidate.

Figure 3F:
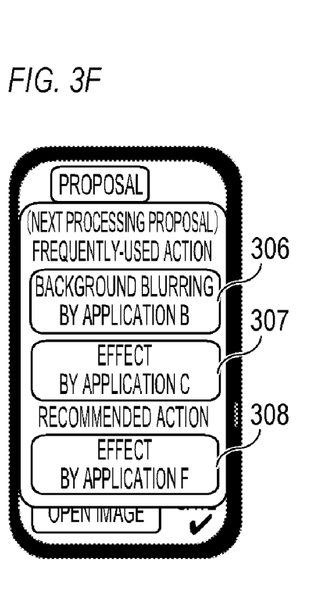

The description of FIG. 2B will be given again. In S215, the system control unit 50 notifies the user of the action candidates (application and image processing) determined in S214. The notification is realized by the display of the notification screen of the display unit 109 in the present embodiment but may be realized by other methods using sound or the like. FIG. 3F shows an example of the notification screen. On the notification screen of FIG. 3F, two action candidates 306 and 307 based on the individual history information and one action candidate 308 based on the general history information are displayed. Note that the number of the action candidates is not particularly limited.

In S216, the system control unit 50 executes any of the action candidates (actions) according to a user operation to specify (select) any of the action candidates notified in S215 (next-action execution processing). When a plurality of action candidates are notified in S215, the system control unit 50 executes a specified action candidate (action) according to a user operation to specify (select) any of the notified plurality of action candidates. The details of the next-action execution processing will be described later using the flowchart of FIG. 7.

In S217, the system control unit 50 executes the generation, recording, updating, or the like of the image history information according to the action executed in S216 like the processing of S205.

In S218, the system control unit 50 executes the generation, recording, updating, or the like of the individual history information according to the action executed in S216 like the processing of S206. Note that the system control unit 50 may further execute the generation, recording, updating, or the like of the general history information in S206 and S218.

In S219, the system control unit 50 determines whether to notify the user of candidates for an action that is to be next executed in succession to the action executed in S216. For example, the system control unit 50 determines whether a user operation to specify (select) the proposal icon 305 of FIG. 3E has been executed. The processing proceeds to S212 when the candidates for the action that is to be next executed are notified to the user (when the user operation to specify the proposal icon 305 has been executed). The next-action processing ends when the candidates for the action that is to be next executed are not notified to the user (when the user operation to specify the proposal icon 305 has not been executed).

Next-Action Execution Processing

Figure 7:
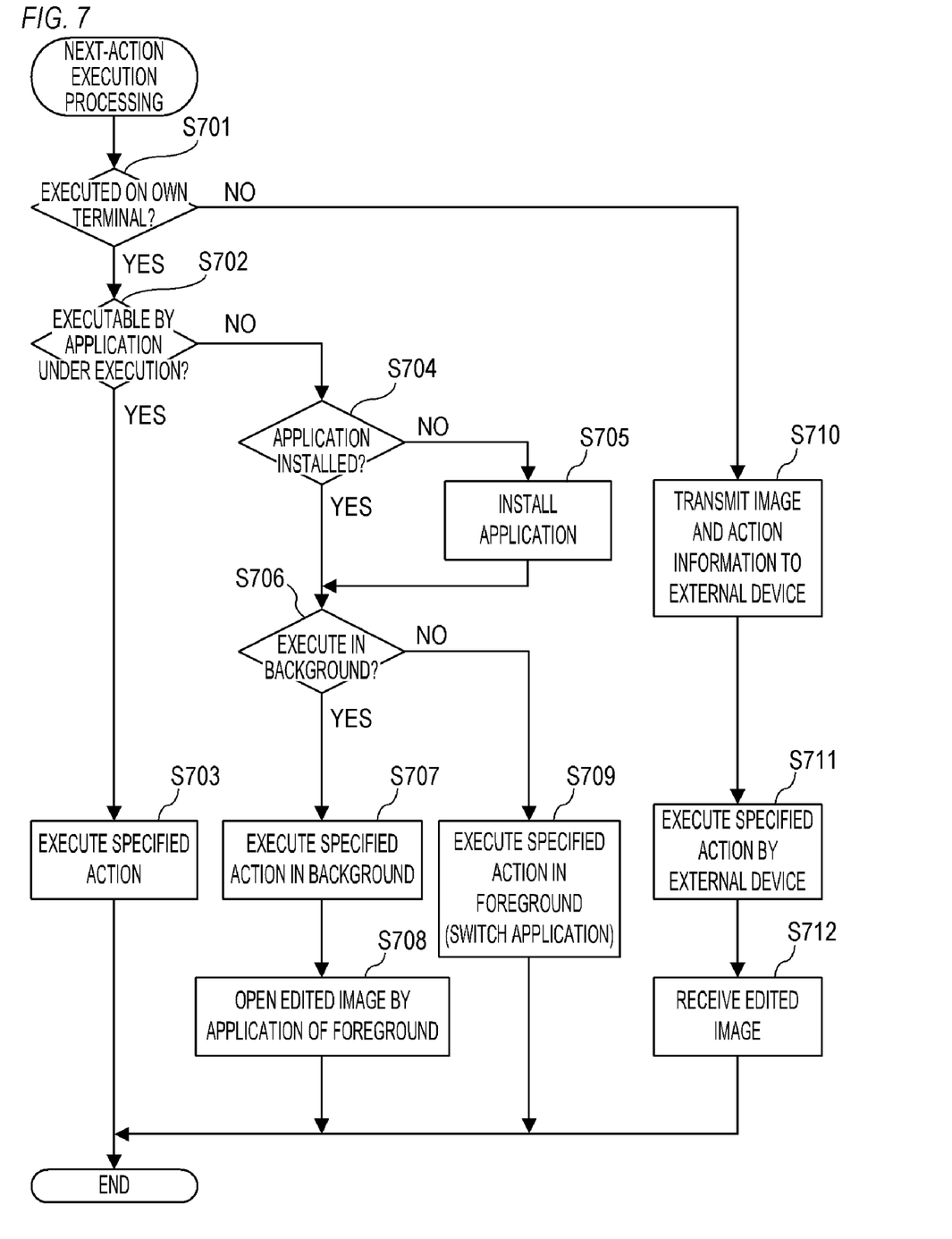
FIG. 7 is a flowchart of next-action execution processing according to the present embodiment.

FIG. 7 is a flowchart showing the details of the next-action execution processing executed in S216 of FIG. 2B. The next-action execution processing is realized when the system control unit 50 develops and executes a program stored in the non-volatile memory 121 in the system memory 122.

In S701, the system control unit 50 determines whether the specified action (the action candidate specified by the user operation in S216 of FIG. 2B) is an action that is to be executed by the mobile terminal 100. The processing proceeds to S702 when the specified action is the action that is to be executed by the mobile terminal 100. The processing proceeds to S710 when the specified action is an action that is to be executed by an external device.

In S702, the system control unit 50 determines whether the specified action is executable by an application (foreground) under execution. The processing proceeds to S703 when the specified action is executable by the application under execution. Otherwise, the processing proceeds to S704.

In S703, the system control unit 50 executes the specified action. The application included in the specified action is under execution. Therefore, image processing included in the specified action is executed in the application under execution.

As described above, the individual history information and the general history information include the processing parameters in the present embodiment. Therefore, the system control unit 50 is allowed to automatically set a suitable processing parameter and execute the image processing of a specified action. As an example, a case in which a combination of an application, the type of image processing, and a processing parameter is managed as an action in the individual history information or the general history information is taken into consideration. In this case, it is possible to automatically set a processing parameter included in a specified action. In this case, an action including a processing parameter having a high using frequency (for example, an action including a mode of the processing parameter) is likely to be determined as an action candidate. Therefore, a processing parameter having a high setting frequency is likely to be set. As another example, a case in which a combination of an application and the type of image processing is managed as an action in the individual history information or the general history information is taken into consideration. That is, a case in which all processing parameters that were set in the past for one action are associated with the action is taken into consideration. In this case, it is possible to automatically set a representative value (such as an average value, a mode, an intermediate value, a maximum value, and a minimum value) of a processing parameter associated with a specified action, that is, a representative value of the processing parameter that was set in the past for the image processing of the specified action. Since a suitable processing parameter is automatically set on the basis of the using frequency of a processing parameter, the user is allowed to save time and effort to specify the processing parameter.

Note that a default processing parameter may be set when a specified action is executed. When executing a specified action, the system control unit 50 may receive a user operation to specify a processing parameter and set a specified processing parameter. The system control unit 50 may set a processing parameter according to a method corresponding to the type of a user operation. For example, when the display unit 109 is capable of receiving a touch operation, an action candidate may be specified (selected) in such a manner that the action candidate is touched by an operating body, such as a finger. After that, a processing parameter may be specified by a slide operation to move the operating body in a predetermined direction (such as a top-bottom direction and a right-left direction) with the touched state held. Then, a processing parameter at a time at which the operating body is released from the display unit 109 may be set. On the other hand, when a tap operation to release the operating body from the display unit 109 without being moved is executed, a processing parameter may be automatically set according to the above method based on the using frequency of the processing parameter.

As will be described in detail later, a specified action could be executed in the background in the present embodiment. It is possible to efficiently set a processing parameter according to the above method regardless of whether a specified action is executed in the foreground or the background.

In S704, the system control unit 50 determines whether the application included in the specified action has been installed in the mobile terminal 100. The processing proceeds to S706 when the application has been installed. Otherwise, the processing proceeds to S705.

In S705, the system control unit 50 installs the application included in the specified action in the mobile terminal 100. On this occasion, the system control unit 50 may inquire of the user about the possibility of the installation by a confirmation display (alert display) on the display unit 109 or the like.

In S706, the system control unit 50 determines whether to execute the specified action (the application included in the specified action) in the background or the foreground. Specifically, the system control unit 50 inquires of the user about whether to execute the specified action in the background or the foreground by a confirmation display on the display unit 109 or the like. The processing proceeds to S707 when the specified action is executed in the background such as when a user operation to specify the execution of the specified action in the background is executed. The processing proceeds to S709 when the specified action is executed in the foreground, such as when a user operation to specify the execution of the specified action in the foreground is executed.

In S707, the system control unit 50 executes the specified action in the background. Specifically, the system control unit 50 activates the application included in the specified action in the background and opens an image to be edited (currently-opened image) by the application of the background. Then, the system control unit 50 performs the image processing included in the specified action on the image to be edited by the application of the background and records the result of the image processing (an edited image) on the recording medium 112.

In S708, the system control unit 50 opens the image to which the image processing has been performed in S707 by the application of the foreground. Thus, the user is allowed to confirm an image of an action execution result without being aware of the switching of an application.

In S709, the system control unit 50 executes the specified action in the foreground. Specifically, the system control unit 50 activates the application included in the specified action in the foreground so that the application of the foreground is switched to the application included in the specified action. Then, the system control unit 50 opens the image to be edited by the application of the foreground and performs the image processing included in the specified action on the image to be edited.

In S710 where the image processing of the specified action is image processing that is to be executed by an external device, the system control unit 50 transmits by using the communication unit 123 the image to be edited and information (action information) on the specified action to the external device.

In S711, the external device executes the specified action with respect to the image to be edited on the basis of the action information. Specifically, the external device executes the application included in the specified action and the image processing. Then, the external device transmits the result of the specified action (edited image) to the mobile terminal 100.

In S712, the system control unit 50 receives the result of the specified action (edited image) from the external device using the communication unit 123. Then, the system control unit 50 opens the received image by the application of the foreground.

According to the present embodiment, candidates for an action that is to be next executed are determined on the basis of the following three information and notified to the user as described above.

Scene information showing a photographing scene of an image to be edited;

Image history information showing the history of actions for an image to be edited; and History information based on at least the history of actions for an image different from an image to be edited (individual history information or general history information).

Thus, operability in a case in which image processing is performed on one image using a plurality of applications may be improved. For example, the user is allowed to save time and effort to determine an application that is to be next executed. In addition, since it is possible for the user to execute a next action only by selecting any of notified action candidates, a complicated operation due to the selection or switching of an application or the like may be prevented.

In addition, since image processing similar between different applications are regarded as the same image processing according to the present embodiment, a more suitable action may be notified as an action candidate. For example, the notification regarding an action including the same type of image processing as image processing that was performed on an image to be edited in the past as an action candidate may be prevented. As a result, the user is allowed to easily select a suitable action, such as an action including image processing of a different type from image processing that was performed on an image to be edited in the past.

The description above describes various embodiments. However, some embodiments are not limited to these specific embodiments, and various modes that do not depart from the spirit of the above-described embodiments are also included in some embodiments. In addition, each of the embodiments described above shows only an example embodiment. It is also possible to appropriately combine the embodiments together.

For example, an example in which the scene information is used as photographing information on photographing of a photographed image (image to be edited) is described, but the photographing information is not limited to the scene information and may include a plurality of information. The photographing information may include other information showing the characteristics of an object in a photographed image. The photographing information may include information on an imaging device with which an image was photographed. For example, the photographing information may include at least any of a photographing parameter, a photographing place, the type of a mobile terminal (an imaging device with which photographing was executed), the format of an image file, the brightness of an object, and the like. The photographing parameter (imaging parameter) is sensitivity, a shutter speed, an aperture, white balance, or the like. A photographing mode is a mode, such as a portrait mode and a landscape mode specified by the user.

Further, a method for determining the priority of an action that is to be next executed is only required to be a method using at least a processing ID (information showing image processing) and is not limited to the above method. For example, when the mobile terminal 100 is connected to an external device, an action that is frequently executed (excluding an action that was executed) by the external device may be determined as an action candidate with priority.

Further, an example in which the individual history information and the general history information are used is described, but other history information may be used. For example, history information based on the history of actions only by advanced camera users may be used. In this case, actions frequently used by the advanced users may be notified as action candidates, and beginners are allowed to easily reproduce the actions of the advanced users.

Further, the history of actions managed by history information, such as the image history information, the individual history information, and the general history information, may or may not be an entire period in the past. For example, the history information may be information based on the history of actions in a predetermined period (for example, one week in the past) up to the present. In this case, it is possible to notify actions that were recently frequently executed by the user (himself/herself) or others as action candidates.

Further, the individual history information is only required to be information based on the history of the actions of specified users (individuals), and its configuration is not limited to the above configuration (FIG. 5A). Similarly, the general history information is only required to be information based on the history of the actions of unspecified users (one or a plurality of users), and its configuration is not limited to the above configuration (FIG. 5B). For example, in the individual history information or the general history information, the using frequencies of respective applications (respective application IDs) and the execution frequencies of respective image processing (respective processing IDs) may be independently (separately) managed. In this case, for example, it is possible to determine image processing having the highest execution frequency as the image processing of an action candidate and determine an application having the highest using frequency among applications capable of executing the determined image processing as the application of the action candidate. Thus, a new action that is not generally used by the user may be proposed (notified).

Further, an example in which action candidates are notified at timing at which the proposal icon 305 (FIG. 3E) is selected is described. However, the timing at which action candidates are notified is not limited to this. For example, action candidates may be notified at timing at which predetermined processing for an image to be edited is executed, for example, predetermined timing, such as timing immediately after an image is opened by an application and timing immediately after an image is stored. Thus, the user is allowed to save time and effort to execute an operation only to confirm action candidates.

Further, an example in which the image history information is recorded in the header of image data is described. However, a method for managing the image data and the image history information is not particularly limited so long as the image data and the image history information are managed in association with each other. For example, the image history information may be managed in a database different from a database for the image data.

Further, an example in which an embodiment is applied to a mobile terminal with a photograph function such as a smart phone is described. However, an image processing apparatus (electronic appliance) to which the embodiment is applicable is not limited to the mobile terminal. The embodiment is applicable to an image processing apparatus so long as the image processing apparatus has an image editing function. For example, it is also possible to apply the embodiment to a digital camera. In this case, a mobile phone terminal, a cloud terminal, other digital camera, or the like may be used as the external device described above. Thus, it is possible to cause an external device to execute an action that is frequently executed by the external device, such as a mobile phone terminal, through a simple user operation on a digital camera to which the embodiment is applied. Further, the imaging unit or the display unit may be provided in the external device of an image processing apparatus to which the present embodiment is applied.

Further, the above various control executed by the system control unit 50 may be executed by one hardware, or a plurality of hardware (for example, a plurality of processors or circuits) may share processing to control the whole apparatus.

According to the present disclosure, operability in a case in which processing is performed on one image using a plurality of applications may be improved.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-041587, which was filed on Mar. 11, 2020 and which is hereby incorporated by reference herein in its entirety.

What is claimed is:

1. An image processing apparatus comprising:
at least one memory; and
at least one processor,
wherein the at least one memory and the at least one processor function as:
an image acquisition unit configured to acquire a photographed image;
an editing unit configured to edit the photographed image by executing an action including an application and image processing that is a function of the application;
an information acquisition unit configured to acquire photographing information on photographing of the photographed image;
a first acquisition unit configured to acquire first history information indicating a history of actions for the photographed image;
a second acquisition unit configured to acquire second history information based on at least a history of actions for an image different from the photographed image, on a basis of the photographing information; and
a control unit configured to determine a candidate for an action that is to be executed next on a basis of the first history information and the second history information and perform control to notify the determined candidate.

2. The image processing apparatus according to claim 1, wherein the photographing information includes at least one of information indicating a characteristic of an object in the photographed image and information on an imaging apparatus with which the photographed image is photographed.

3. The image processing apparatus according to claim 1, wherein the second history information is history information based on a history of actions for an image of photographing information similar to or same as the photographing information on the photographed image.

4. The image processing apparatus according to claim 1, wherein the control unit determines, as the candidate, an action including image processing not performed on the photographed image, among actions indicated by the second history information.

5. The image processing apparatus according to claim 1, wherein the control unit determines the candidate further on a basis of a state of an application in the image processing apparatus.

6. The image processing apparatus according to claim 1, wherein the editing unit causes an external device to execute an action, depending on the action, and
the control unit determines the candidate further on a basis of executability of the action by the external device.

7. The image processing apparatus according to claim 1, wherein the control unit performs control to notify the candidate at timing at which predetermined processing relating to the photographed image is executed.

8. The image processing apparatus according to claim 1, wherein image processing that are similar between different applications are regarded as same image processing.

9. The image processing apparatus according to claim 1, wherein the control unit determines the candidate on a basis of image processing that is determined from the first history information and most-recently performed on the photographed image.

10. The image processing apparatus according to claim 1, wherein the control unit determines the candidate on a basis of an execution frequency of the action indicated by the second history information.

11. An image processing method comprising:
acquiring a photographed image;
editing the photographed image by executing an action including an application and image processing that is a function of the application;
acquiring photographing information on photographing of the photographed image;
acquiring first history information indicating a history of actions for the photographed image;
acquiring second history information based on at least a history of actions for an image different from the photographed image, on a basis of the photographing information;
determining a candidate for an action that is to be executed next on a basis of the first history information and the second history information; and
performing control to notify the determined candidate.

12. A non-transitory computer readable medium that stores a program, wherein the program causes a computer to execute an image processing method comprising:
acquiring a photographed image;
editing the photographed image by executing an action including an application and image processing that is a function of the application;
acquiring photographing information on photographing of the photographed image;
acquiring first history information indicating a history of actions for the photographed image;
acquiring second history information based on at least a history of actions for an image different from the photographed image, on a basis of the photographing information;
determining a candidate for an action that is to be executed next on a basis of the first history information and the second history information; and
performing control to notify the determined candidate.

* * * * *